Oct. 21, 1947.     E. WILDHABER     2,429,284
FACE CLUTCH

Filed Feb. 23, 1942     2 Sheets-Sheet 1

Inventor
ERNEST WILDHABER

By *B.F. Schlesinger*
Attorney

Oct. 21, 1947.   E. WILDHABER   2,429,284
FACE CLUTCH
Filed Feb. 23, 1942   2 Sheets-Sheet 2

Inventor
ERNEST WILDHABER
By
Attorney

Patented Oct. 21, 1947

2,429,284

UNITED STATES PATENT OFFICE 2,429,284

FACE CLUTCH

Ernest Wildhaber, Brighton, N. Y., assignor to Gleason Works, Rochester, N. Y., a corporation of New York Application February 23, 1942, Serial No. 432,026

22 Claims. (Cl. 287—103)

The present invention relates to face clutches. More particularly it relates to face clutches of the type which are held in engagement by pressure and which are employed as couplings to connect two parts so that they may rotate together.

One object of the invention is to provide a toothed face clutch or coupling which can be made accurately at low cost and in which both sides of a tooth space can be cut or ground simultaneously.

A further object of the invention is to provide a face clutch or coupling containing substantially radially arranged teeth that taper in height from end to end in which the taper is such that the tooth strength is substantially constant along the whole length of the teeth.

Another object of the invention is to provide a toothed face clutch or coupling in which the tooth pressure may be concentrated at the center of the tooth length and relieved from the tooth ends.

Still another object of the invention is to provide a toothed face clutch or coupling in which the tooth contact area will extend not only for less than full length of the teeth but also for less than the full profile height of the teeth, and be squarely positioned.

A further object of the invention is to provide a toothed face clutch or coupling whose teeth can be accurately ground on existing machines.

A still further object of this invention is to provide a toothed face clutch or coupling in which the two members have well rounded tooth bottoms and rounded or chamfered tooth tops so that only a moderate clearance is required between bottoms of the tooth spaces and the tops of the teeth of the two members of the clutch.

Other objects of the invention will be apparent hereinafter from the specification and from the recital of the appended claims.

Face clutches or couplings made according to the present invention have longitudinally curved teeth which extend substantially radially of the clutch axis, that is, the median longitudinal center lines of the teeth and the tooth spaces of the clutch members are radial of the clutch axis. The teeth also taper in height from end to end.

If such teeth were cut with an ordinary face-mill cutter having side cutting edges of straight profile, the mating tooth surfaces of the two clutch members would contact with a so-called "bias bearing." This is because each member of the clutch would be cut with the axis of the cutter perpendicular to a plane tangent to the root surface of the clutch member; and because the root surfaces of the two members are inclined to one another when the two clutch members are in engagement, so that as a consequence lines extending in the direction of the profiles or heights of the mating tooth surfaces would be inclined to one another. This "bias" condition may be avoided by the process of the present invention. Here spherical or very close to spherical face-mill cutters are used, that is, face-mill cutters having blades whose side-cutting edges are of circular arcuate profile shape. For spherical cutters, the centers of the profiles of the side-cutting edges lie on the axis of the cutter. By using such cutters, tooth surfaces may be cut on the two members of the clutch which are spherical surfaces or conjugate to spherical surfaces, or which closely approximate such surfaces, and which will engage with properly positioned tooth bearing or contact.

The two members of a face clutch made according to the present invention may be cut either in a forming or in a generating operation. In a forming operation, the clutch blank is held stationary on its axis and the rotary cutter is simply fed into the blank until the full depth of a tooth space has been cut and then is withdrawn, and the blank indexed. In the generating operation, the blank is preferably rotated on its axis during cutting and simultaneously a relative rotational movement is produced between the rotating cutter and the blank about an axis intersecting the blank axis and preferably parallel to the cutter axis. When one tooth space has been generated, the cutter is withdrawn from engagement with the blank, and the blank indexed.

When both members are cut either in forming or generating operations, with the same or identical spherical face-mill cutters, the mating tooth surfaces may have longitudinally localized tooth bearing or contact. Thus the clutch will be rendered insensitive to slight errors in cutting and to hardening distortions and will carry properly the transmitted loads without the loads being unduly concentrated at the ends of the clutch teeth.

Mating clutch members, which are produced with true spherical cutters, can be made so that their contracting side tooth surfaces have contact along less than the full length of the tooth surfaces. If it is desired that the mating tooth surfaces of the clutch members have less than full contact along their profiles, that is, in the direction of tooth height, also, then they may be cut with face-mill cutters, which depart somewhat from true spherical form. For instance, a cutter may be employed which has outside cutting edges less curved than on a spherical cutter and which has inside cutting edges more curved than on a spherical cutter.

When the two clutch members are generated, the tops of the tooth surfaces can be rounded or chamfered simultaneously with the production of the sides of the teeth by modifying the ratio of roll during generation. The rounding or chamfering of the teeth permits of fully rounding the bottoms of the tooth spaces of the clutch members and of still engaging the clutch members with the minimum clearance between the tops of the teeth of one clutch member and the bottoms of the tooth spaces of the other member.

When the tooth surfaces of both clutch members are generated, it frequently happens that the profile contact between the two members is less than is desirable. Greater profile contact can be obtained by using cutters whose outside cutting edges are more curved than in a spherical cutter and whose inside cutting edges are less curved.

Clutches or couplings made according to the present invention can be used wherever it is desired to connect two parts to rotate together. For instance, they may be used to connect the several parts of a built-up crankshaft. Other uses will suggest themselves to those skilled in the art.

Figure 11:
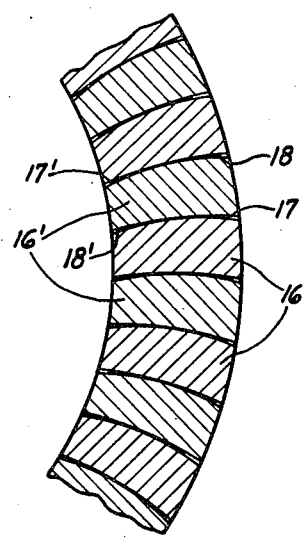
Figure 12:
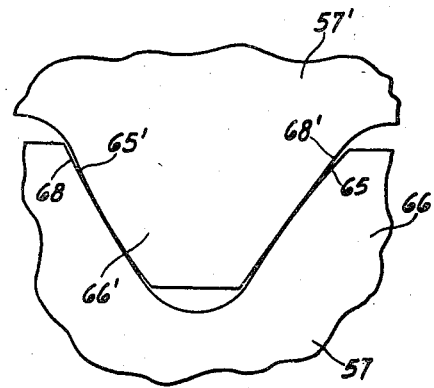

Fig. 11 is a sectional view through the two members of a clutch taken in the common pitch plane and showing how the mating teeth of the two members of a clutch produced according to different embodiments of the present invention may engage with less than full lengthwise tooth contact; and Fig. 12 is a fragmentary elevational view on an enlarged scale showing how the two members of a clutch may be made also according to different embodiments of the present invention so that the mating tooth surfaces will have less than full profile contact when in engagement.

The two members 15 and 15' of a clutch made according to this invention are preferably identical with one another except for hand. Each member has teeth 16 whose side surfaces 17 and 18 are longitudinally curved. The teeth are arranged substantially radially of the clutch axis 19, that is, the median line 20 of a tooth of a clutch member is radial of the clutch axis 19.

For cutting the longitudinally curved teeth of the clutch members, face-mill cutters may be employed. Thus it is possible not only to cut the clutch members efficiently and at high speed, but it is possible also to obtain a clutch in which the mating tooth surfaces have a desirable localization of lengthwise tooth contact. Thus, opposite sides of the tooth spaces of each member of the clutch may be produced simultaneously with the result that the longitudinally convex and the longitudinally concave sides of a tooth space will be cut from the same center but with different radii of lengthwise curvature. By cutting both members of a clutch, then, with face-mill cutters, the longitudinally convex sides of the teeth of one clutch member may be made to have a different radius of lengthwise curvature from the mating longitudinally concave sides of the teeth of the other clutch member. Hence, the mating sides of the clutch teeth will not contact along their full length, but will have a tooth bearing or contact localized at the longitudinal center of the teeth and disappearing at the tooth ends. This structure is illustrated in Fig. 11 where 16 denotes the teeth of one clutch member and 16' the teeth of the mating clutch member. It will be seen that the longitudinally convex sides 17 of the teeth 16 engage with the longitudinally concave sides 18' of the teeth 16' along less than the full length of the mating surfaces while the longitudinally concave sides 18 of the teeth 16 engage with the longitudinally convex sides 17' of the teeth 16' also along less than their full length.

Figure 1:
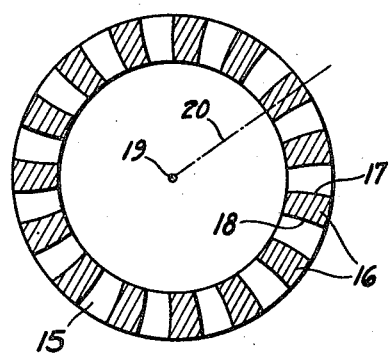
Fig. 1 is a sectional view of a face clutch member made according to this invention, the section being taken in a mean plane, hereinafter referred to as the pitch plane, which is perpendicular to the clutch axis and in which the thickness of the teeth of the clutch member equals the width of its tooth spaces.
Figure 2:
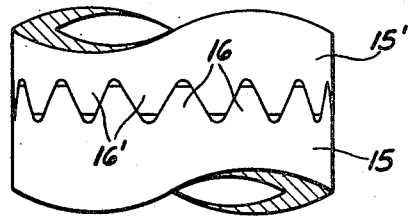
Fig. 2 is an elevational view, showing the two members of a clutch made according to this invention in engagement.
Figure 3:
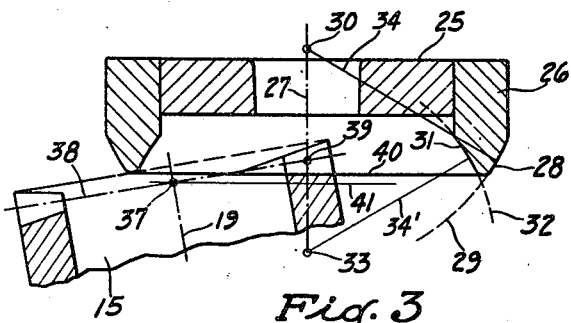
Fig. 3 is a diagrammatic view in section, showing the relative positions of the cutter and clutch blank in the cutting of the teeth of a clutch member according to one embodiment of this invention.
Figure 4:
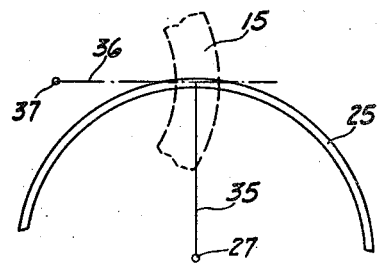
Fig. 4 is a fragmentary diagrammatic plan view taken in the plane of the tips of the cutter blades and further illustrating the relative positions of the cutter and clutch blank in the cutting of the clutch member according to this embodiment of the invention.

The clutch members are made with teeth and tooth spaces tapering in depth from end to end, as clearly illustrated in Fig. 3. To avoid bias contact between the mating tooth surfaces along a narrow strip running diagonally of the tooth sides from one end of the teeth to the other, and to obtain a wide and squarely positioned contact area, the clutch members may be cut or ground with spherical face mill cutters or corresponding grinding wheels such as shown at 25 in Fig. 3. The cutter 25 has a plurality of circumferentially arranged cutting blades 26 which extend in the general direction of the axis 27 of the cutter and which have cutting portions that project beyond one side face of the cutter. The outside and inside cutting profiles of the cutter are of circular arcuate shape and are centered on the axis of the cutter. Thus the outside cutting profile 28 of a blade lies in a circular arc 29 whose center is at 30 on the axis of the cutter, while the inside cutting profile 31 of a blade lies along a circular arc 32 whose center is at 33 on the axis 27 of the cutter. By cutting the two clutch members with spherical cutters, spherical surfaces can be produced on the mating surfaces which can be made to match in all directions.

In order to cut the tooth spaces of a clutch member with the spherical cutter 25, the cutter is so positioned that the normals 34 and 34' (Fig. 3) to the outside and inside cutting surfaces of the cutter at a mean point in the length of a tooth space of the clutch blank lie in a plane 35 perpendicular to a line 36 radial of the pitch apex 37 of the clutch member. The clutch blank 15 itself is so positioned with reference to the cutter, that the axis 19 of the blank is inclined to a plane 40 perpendicular to the cutter axis 27 and tangent to the root surface of the blank. Further, this plane 40 will be offset from the apex 37 of the pitch plane 38 of the blank. It contains the root line of the tooth space to be cut.

The offset of the plane 40 from the pitch apex 37 is such that the intersection line 41 (Figs. 3 and 5) of planes 42 and 43, that are tangent to opposite sides 17 and 18, respectively, of a tooth space of the clutch member at mean points 39 in the tooth length, will pass through the pitch apex 37. When this condition is fulfilled, both sides of a tooth space of the clutch member may be cut or ground simultaneously.

In the cutting or grinding operation, the cutter or grinding wheel is rotated on its axis 27 and a relative depthwise feed movement is effected between the cutter and work in the direction of the cutter axis or of the work axis until the tooth spaces of the work have been cut or ground to full depth. Then the cutter or wheel is withdrawn from engagement with the work and the work is indexed. Then the cutter or wheel is fed back into engagement with the work and the alternate cutting or grinding and indexing proceeds as before until the clutch member is finished.

Figure 5:
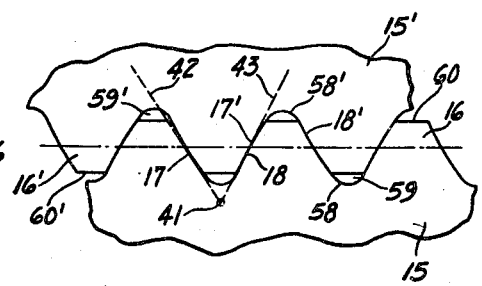
Fig. 5 is a fragmentary elevational view on an enlarged scale of the two clutch members in engagement, further illustrating their structure.

Fig. 5 shows fragmentarily a pair of engaged clutch members that have been cut by the process of Fig. 3. As already stated, the clutch member 15 has teeth 16 whose opposite side surfaces 17 and 18, respectively, are parts of substantially convex and concave spherical surfaces. Likewise, the clutch member 15' has teeth 16' whose opposite side surfaces 17' and 18', respectively, are parts of substantially convex and concave spherical surfaces, respectively. In practice, the profile curvatures of the tooth surfaces that is, the curvatures in the directions of the tooth heights will be very slight and ordinarily will not be noticeable.

The bottoms 58 and 58', respectively, of the tooth spaces of the clutch members are well rounded and sufficient clearance 59 is provided between the tops 60' of the teeth of the clutch member 15' and the bottoms 58 of the tooth spaces of the clutch member 15 so that the sides of the teeth 16' of the clutch member 15' will not interfere with the rounded tooth bottoms of the mating clutch element 15. Likewise, sufficient clearance 59' will be provided between the tops 60 of the clutch member 15 and the rounded tooth bottoms 58' of the clutch element 15' to avoid such interference.

Clutch members, whose teeth are cut or ground as shown with true spherical cutters or corresponding grinding wheels, have a tooth contact or bearing reduced in length only. A reduction also in the width of tooth contact, that is, a tooth bearing having some relief for clearance at the tops and bottoms of the tooth profiles, may be obtained by using cutters or wheels such as shown at 45 in Fig. 6. The cutter 45 has an outside cutting surface whose profile 46 is less curved than on a spherical cutter. The profile 46 is a circular arc whose radius is denoted at 47 and whose center 48 is offset beyond the axis 49 of the cutter. The inside cutting surface has a profile 51 which is more curved than on a spherical cutter. The radius of curvature 52 of the profile 51 is less than the radius of curvature of a spherical cutter. The center of the profile 51 is at 53. The cutter 45 is used in the same manner as the cutter 25, being positioned so that its axis 49 is perpendicular to a plane 55 offset from the pitch apex 56 of the work piece 57, and the cutter is rotated on its axis 49 while being fed into depth to cut a tooth space of the blank.

Figure 6:
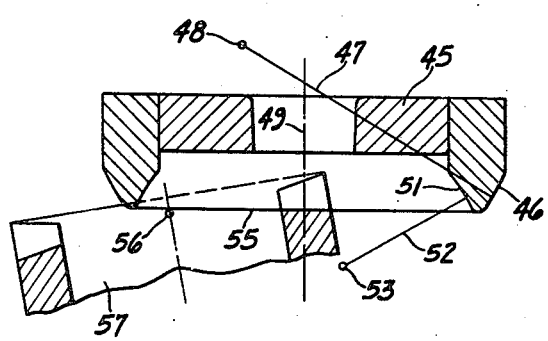
Fig. 6 is a view similar to Fig. 3, but showing how a modified form of cutter may be employed to produce tooth surfaces on clutch members constructed according to a different embodiment of this invention that will engage with less than full profile contact.

Fig. 12 illustrates the shapes of the tooth profiles of a pair of mating clutch members cut by the process disclosed in Fig. 6. It will be seen that the convexly profiled sides 65 of the teeth 66 of the clutch member 57 have localized profile contact with the mating concavely profiled sides 68' of the teeth 66' of the clutch element 57'. Likewise, it will be seen that the concavely profiled sides 68 of the teeth of the clutch member 57 have only localized profile contact with the mating convexly profiled sides 65' of the teeth of the clutch element 57'. The mating profiles have relief or clearance at both the tops and bottoms of the teeth.

Figure 9:
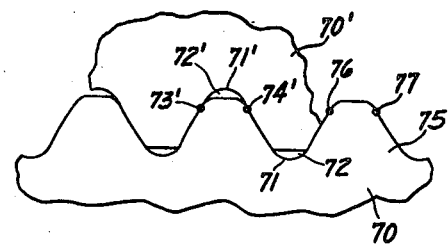
Fig. 9 is a fragmentary elevational view of a clutch whose members have rounded or chamfered tooth tops.

Fig. 9 illustrates a modification of the invention in which the two clutch elements 70 and 70' have tooth spaces whose bottoms 71 and 71', respectively, have a considerably larger radius of curvature than the clutch members of Fig. 5. The bottom curve for a space of the clutch member 70' starts, for instance, at point 73' and extends to point 74'. Despite the greater round in the bottoms of the tooth spaces, the clearances 72 and 72' between the tops of the teeth of one clutch member and the bottoms of the tooth spaces of the other clutch member in Fig. 9 is reduced as compared with the clearance between the clutch members shown in Fig. 5. To avoid interference between the clutch members, therefore, the teeth of the two clutch members are rounded off at their tops. Thus, each tooth 75 of the clutch member 70 is rounded off at its top starting at the points 76 and 77 at opposite sides of the tooth.

Figure 7:
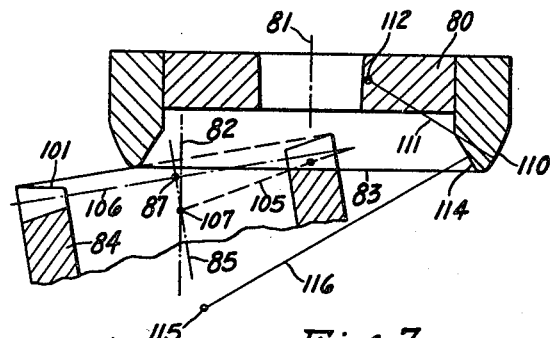
Fig. 7 is a diagrammatic sectional view similar to Figs. 3 and 6, but illustrating how a still further modified form of cutter may be employed in a generating process to generate tooth surfaces on a clutch member constructed according to a still further embodiment of the invention that will have proper profile as well as lengthwise contact when engaged with a mating clutch member.
Figure 8:
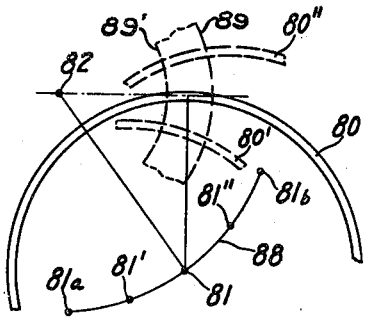
Fig. 8 is a diagrammatic plan view, taken in the plane of the tip of the cutter, showing how the ratio of generating roll may be varied during the generation of the tooth surfaces of a clutch member to produce rounded or chamfered tooth tops on the clutch member in the same operation with the cutting of the tooth sides.

The rounding off of the tops of the teeth may be done in the same operation with the generation of the tooth sides by the process illustrated in Figs. 7 and 8. A cutter or grinding wheel 80 is used whose axis is at 81, and the cutter or wheel is mounted to rotate on its own axis and to be moved simultaneously about an axis 82 which is parallel to the axis 81 of the cutter and which ordinarily intersects the blank axis 85. The cutter is positioned, as before, so that its axis 81 is perpendicular to the plane 83 tangent to the root surface of the clutch blank, and ordinarily the clutch blank 84 has its axis 85 so inclined to the cutter that the plane 83 intersects the blank axis 85 in a point lying outside of the pitch apex 87 of the blank.

The cutter may be fed axially into the blank to full depth position before beginning the generating roll, or feed may take place during the first part of the generating roll, or the cutter may be positioned at full depth and the generating motion itself may be employed to feed the cutter into the blank as well as to generate the tooth sides.

In the generating operation, the cutter or grinding wheel 80 is rotated on its axis 81 and simultaneously a relative swinging movement is produced between the cutter or wheel and the blank about the axis 82 while the blank 84 is rotated in time with such movement on its axis 85. The swinging movement may be effected by mounting the cutter in the cradle of a cutting machine with the axis of the cutter parallel to the cradle axis, and rotating the cradle on its axis in time with the uniform work rotation. In the relative swinging movement, the axis of the cutter, therefore, describes an arcuate path 88 (Fig. 8). This swinging motion is uniform between the positions 81' and 81'', that is, while the main portions of the teeth of a clutch member are being generated, but between the point 81' and the end point 81a at one end of the swinging movement of the cutter and between the point 81'' and the point 81b at the opposite end of the swinging movement of the cutter, the rate of swing of the cutter, that is, of the cradle on which it is mounted, is modified so as to generate the rounded top portions on the opposite tooth sides beginning at the points 76 and 77, respectively. During the swing of the cutter from the point 81a to the point 81' and from the point 81'' to the point 81b, then, the cradle moves at gradually and continuously varying speed while the work continues to rotate at a uniform rate. 80', 80, and 80'' denote three different positions of the cutter during the swinging movement, and the portions of these cutter paths between the outer and inner boundaries 89 and 89', respectively, of the tooth zone of the work indicate, of course, the three corresponding positions of the tooth space of the work being cut.

After the two sides of a tooth space have been generated, the cutter is withdrawn axially from engagement with the work, and the work is indexed. Then the cycle is started anew to cut another tooth space in the work.

During generation of a tooth space of the work, then, according to the embodiment disclosed diagrammatically in Figs. 7 and 8, the cutter 80 rotates continuously on its axis 81 at a uniform velocity, and the work rotates on its axis 85 at a uniform velocity, and simultaneously the cutter is swung about an axis 82. During the first part of this swinging movement, namely, while the cutter is travelling between the points 81a and 81', the swing about axis 82 is at a varying rate, but during the swing between points 81' and 81'', the swinging movement is at a uniform rate, while during the swing between points 81'' and 81b, the swing is again at a varying rate. In this way, the rotating cutter or grinding wheel, whose cutting edges are sweeping along the length of a tooth space of the work as the cutter rotates, is also rolled relative to the work to generate desired profile shapes on opposite sides of the tooth space.

The rotation of the cutter on its axis 81 controls the lengthwise shape of the tooth space. The rotation of the work on its axis and the relative swing of the cutter and work about axis 82, which together constitute the generating roll, control the profile shapes of the tooth sides, that is, the shapes of the tooth surfaces in the direction of the tooth height. Of course, the cutter is withdrawn from engagement with the work at the end of the generating roll. It is fed back into engagement with the work again, after the work has been indexed, in order to start a new generating cycle.

Gear cutting and gear grinding machines provided with means for modifying the ratio of roll are in general use and these can be employed for cutting or grinding gears according to the process described with reference to Figs. 7 and 8. In the grinding machines and in suitable cutting machines, the cradle motion is cam-operated and the described process can be practiced directly on these machines merely by employing a proper cam.

Figure 10:
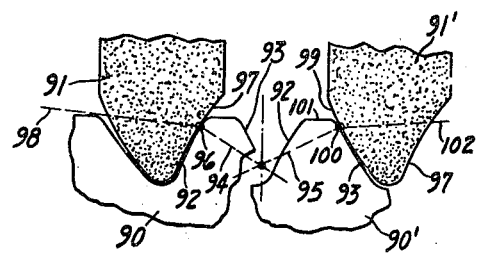
Fig. 10 is a diagrammatic view further illustrating how the ratio of generating roll is modified in order to produce a chamfer in the same operation with the generation of the sides of the clutch teeth.

Fig. 10 illustrates diagrammatically the effect of modification in the ratio of roll. Two different positions of the clutch element during generation of the sides of a tooth space of a clutch member are shown fragmentarily at 90 and 90', respectively, while 91 and 91', respectively, denote two different positions in the roll of the grinding wheel used to generate the opposite tooth profiles. The principal parts of the sides 92 and 93 of the tooth space are generated, as already described, with uniform rates of roll, which means that the grinding wheel is swung about axis 82 at a uniform rate while the work rotates on its axis 85 also at a uniform velocity. During the generation of these parts of the tooth surfaces, the approximate lines of action between the tooth surfaces and the grinding wheel, which are the paths of the points of contact of the wheel and work, are such as denoted at 94 and 95, respectively. During the first part of the roll, that is, while the portion of the side 92 of the tooth space from the tooth top 101 to the point 96 is being generated, modified ratio of roll is employed that is, the rate of swing about axis 82 is varied although the work continues to rotate at a uniform velocity. At this time, the line of action or the path of the point of contact between the concave side 97 of the grinding wheel and the tooth side 92 is in the direction of the line 98. Likewise, during the latter part of the roll, when the convex side 99 of the grinding wheel is grinding the part of the side 93 of the tooth space between the point 100 and the top 101 of the tooth, modified ratio of roll is employed that is, again the rate of swing about axis 82 is varied although the work continues to rotate at a uniform velocity. The line of action or the path of the point of contact between the grinding wheel and the tooth surface is then along the line 102. The portions 98 and 102 of the lines of action are much less inclined to the pitch plane of the clutch member than the parts 94 and 95 of the lines of action. The grinding wheel, of course, rotates at a uniform velocity on its axis 81 during the whole of the cutting operation.

Generation of the tooth surfaces by uniform rotation about two fixed axes 82 and 85 amounts to a rolling with a fixed instantaneous axis. This instantaneous axis should be so directed that at the moment of changeover from uniform motion to varying motion at the points 81' and 81" (Fig. 8), the line of contact between the cutting or grinding surface of the tool and the generated surfaces of the clutch teeth should extend substantially lengthwise of the clutch teeth in the direction of the tops of the teeth. In other words, this line should be the juncture of the side surface of the tooth and the rounded top portion of the tooth. In Fig. 7, this instantaneous axis is denoted at 105. It extends substantially in the direction of the tooth tops 101 and is inclined to the pitch plane 106. This is obtained by adjusting the work in the generating machine so that the pitch apex 87 of the work is beyond the intersection point 107 of the axes 82 and 85. In other words, the work is adjusted so that its apex 87 is beyond the machine center 107, and the ratio between the two timed rotary motions about the axes 82 and 85 is so chosen as to give the required inclination of the instantaneous axis 105. In this way, the tooth space bottoms, the opposite sides of the tooth space, and the rounded tops of these sides may all be finished in the same operation.

Generation causes the mating tooth profiles to curve away from one another so that a truly spherical grinding wheel or cutter, such as shown in Fig. 3, produces profiles which are separated at their tops and bottoms. This separation is often more than is desirable. It can be reduced to the desired amount by employing a cutter or grinding wheel such as shown in Fig. 7. This cutter or wheel 80 has a departure from a true spherical cutter which is in the opposite direction from that of the cutter 45 shown in Fig. 6. The cutter 80 has an outside cutting surface whose profile 110 is more curved than on a spherical cutter and has an inside cutting surface whose profile 114 is less curved than on a spherical cutter. The radius 111 of the outside profile 110 is centered at 112. The inside profile 114 is a circular arc centered at 115 and has a radius 116 greater than the radius of a spherical cutter of corresponding diameter and pressure angle. The cutter 80 cuts off less stock from the tops and bottoms of the tooth profiles than does a spherical cutter. Hence, it produces mating tooth profiles which have an area of contact widened as compared with the area of profile contact that would be produced were the mating tooth surfaces of both clutch members generated with true spherical cutters.

Whatever the method of generation, the tooth spaces cut or ground on the clutch or coupling members will be conjugate to the cutter or grinding wheel employed to produce them, that is, they will be conjugate to coaxial surfaces of revolution, which are the surfaces traced by the cutter or grinding wheel as it rotates. The term "conjugate" is used here, as it is commonly used in the art of gears and other toothed elements, to denote tooth surfaces which will properly engage and intermesh.

Now while the invention has been described in connection with the use of annular face-mill cutters or grinding wheels, as the cutting tools, it will be understood that the tooth surfaces of the clutch members might be cut instead with reciprocating tools of suitable profile curvature which are swung in circular paths across the face of the clutch blank about axes to sweep out tooth surfaces of the desired lengthwise curvature. Thus, for instance, particularly when the clutch members are formed without generating roll, the tooth surfaces may be ground with a cupped grinding wheel whose sides are of circular arcuate profile curvature by rotating said wheel on its own axis and simultaneously swinging said wheel about the axis of lengthwise curvature of the tooth surfaces to be ground, and effecting the required relative depthwise feed movement between wheel and work.

In general it may be said that while the invention has been described in connection with certain specific embodiments thereof, it will be understood that it is capable of various further modifications, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A toothed face clutch member having teeth and toothed spaces curved longitudinally and tapering in depth from end to end, opposite sides of the teeth being longitudinally concave and longitudinally convex, respectively, and opposite sides of the tooth spaces being curved longitudinally about a common axis.

2. A toothed face clutch member having longitudinally curved teeth and tooth spaces which extend generally radially of the clutch axis and which taper in depth from end to end, planes tangent to opposite sides of the tooth spaces intersecting in lines passing through the pitch apex of said clutch member and the root lines of said tooth spaces, when extended, intersecting the axis of said member at a point beyond the pitch apex of said member.

3. A toothed face clutch member having teeth curved longitudinally and tapering in depth from end to end, the sides of said teeth being portions of surfaces of revolution of curved profile shape.

4. A toothed face clutch member having teeth and tooth spaces curved longitudinally and tapering in depth from end to end, opposite sides of tooth spaces being convex and concave surfaces of revolution, respectively.

5. A toothed face clutch member having teeth and tooth spaces curved longitudinally and tapering in depth from end to end, opposite sides of the tooth spaces being coaxial surfaces of revolution.

6. A toothed face clutch member having teeth curved longitudinally and tapering in depth from end to end and having generated tooth sides, opposite sides of a tooth space being generated conjugate to coaxial surfaces of revolution.

7. A toothed face clutch member having teeth and tooth spaces curved longitudinally and tapering in depth from end to end, said teeth and tooth spaces extending generally radially of the clutch axis and opposite sides of each tooth space being generated conjugate to coaxial surfaces of revolution.

8. A toothed face clutch member having teeth and tooth spaces which are curved longitudinally, opposite sides of each tooth space being portions of coaxial surfaces of revolution.

9. A toothed face clutch member having teeth and tooth spaces curved longitudinally and tapering in depth from end to end, said teeth and tooth spaces extending generally radially of the clutch axis, and opposite sides of each tooth space being portions of coaxial surfaces of revolution.

10. A toothed face clutch member having teeth and tooth spaces curved longitudinally and tapering in depth from end to end, opposite sides of each tooth space being portions of coaxial surfaces of revolution, and the extended root line of each tooth space intersecting the clutch axis in a point beyond the pitch apex of the clutch member.

11. A toothed face clutch member having teeth curved longitudinally and tapering in depth from end to end, the tops of said teeth being rounded off uniformly from end to end.

12. A toothed faced clutch member having teeth and tooth spaces curved longitudinally and tapering in depth from end to end, opposite sides of each tooth space being conjugate to coaxial surfaces of revolution, and the top portions of said teeth being rounded off uniformly from end to end.

13. A toothed face clutch comprising two engaging members, each of which has teeth curved longitudinally and tapering in depth from end to end, opposite sides of the teeth of each member being of concave and convex lengthwise curvature, respectively, the concave sides of the teeth of one member engaging the convex sides of the teeth of the other member, and the concave sides of the teeth of one member being of different radii of lengthwise curvature from the mating convex sides of the teeth of the other member.

14. A toothed face clutch, comprising two engaging members, each of which has longitudinally curved teeth whose opposite sides are portions of convex and concave surfaces of revolution, the convex tooth sides having a smaller radius than the concave tooth sides whereby when the two clutch members are in engagement, the amount of pressure at the tooth ends is reduced.

15. A toothed face clutch comprising two engaging members, each of which has teeth curved longitudinally and tapering in depth, the contacting tooth surfaces of the two members being relieved relative to one another at the ends of the tooth surfaces and at the tops and bottoms of the tooth profiles.

16. A toothed face clutch member each of whose tooth spaces taper in depth from end to end and has opposite side tooth surfaces that are curved longitudinally from end to end about a common axis.

17. A tooth face clutch member each of whose tooth spaces taper in depth from end to end and has opposite side tooth surfaces that are curved longitudinally from end to end about a common axis which is inclined to the axis of the clutch member.

18. A toothed face clutch member having longitudinally curved teeth and tooth spaces which extend generally radially of the clutch axis and which taper in depth from end to end, opposite sides of the teeth of said member being longitudinally convex and longitudinally concave, respectively, and opposite sides of the tooth spaces of said member being curved longitudinally about a common axis.

19. A pair of toothed face clutch members, each of which has longitudinally curved teeth and tooth spaces that extend generally radially of the clutch axis and that taper in depth from end to end, opposite sides of the teeth of each member being longitudinally convex and longitudinally concave, respectively, and opposite sides of the tooth spaces of each member being curved longitudinally about a common axis, and the longitudinally convex sides of the teeth of one member engaging with the longitudinally concave sides of the teeth of the other member.

20. A pair of mating toothed face clutch members, each of which has teeth and tooth spaces curved longitudinally and tapering in depth from end to end, opposite sides of the tooth spaces being convex and concave surfaces of revolution, respectively, the longitudinally concave sides of the tooth spaces of one member of the pair meshing with the longitudinally convex sides of the tooth spaces of the other member of the pair.

21. A pair of mating toothed face clutch members, each of which has teeth which are curved longitudinally and which taper in depth from end to end, said teeth having generated tooth sides, opposite sides of the tooth spaces of each member being generated conjugate to coaxial surfaces of revolution, and the longitudinally concave sides of the tooth spaces of one member of the pair meshing with the longitudinally convex sides of the tooth spaces of the other member of the pair.

22. A pair of toothed face clutch members, each of which has teeth which are curved longitudinally and which taper in depth from end to end, said teeth having generated tooth sides, opposite sides of each tooth space being longitudinally concave and convex, respectively, and being generated conjugate to coaxial surfaces of revolution.

ERNEST WILDHABER.

REFERENCES CITED

The following references are of record in the file of this patent:

UNITED STATES PATENTS

| Number | Name | Date |
|---|---|---|
| 381,196 | Winn | Apr. 17, 1888 |
| 988,729 | Morrow | Apr. 4, 1911 |
| 1,012,657 | Kurschus | Dec. 26, 1911 |
| 1,515,100 | Foster | Nov. 11, 1924 |
| 1,532,564 | Soden-Fraunhofen | Apr. 7, 1925 |
| 1,622,014 | Wildhaber | Mar. 22, 1927 |
| 1,659,402 | Lewis | Feb. 14, 1928 |
| 1,746,571 | Williams | Feb. 11, 1930 |
| 1,764,145 | Blackburn | June 17, 1930 |
| 2,049,127 | Maybach | July 28, 1936 |
| 2,070,191 | Wildhaber | Feb. 9, 1937 |
| 2,015,104 | Wildhaber | Jan. 11, 1938 |
| 2,216,907 | Miller | Aug. 16, 1938 |

FOREIGN PATENTS

| Number | Country | Date |
|---|---|---|
| 20,146 | Great Britain | Oct. 5, 1905 |
| 34,372 | France | Jan. 2, 1929 |
| 294,389 | Italy | Mar. 21, 1932 |